Feb. 13, 1940.  F. W. SLACK  2,190,298
WHEEL SUSPENSION
Original Filed Aug. 26, 1936   2 Sheets-Sheet 1
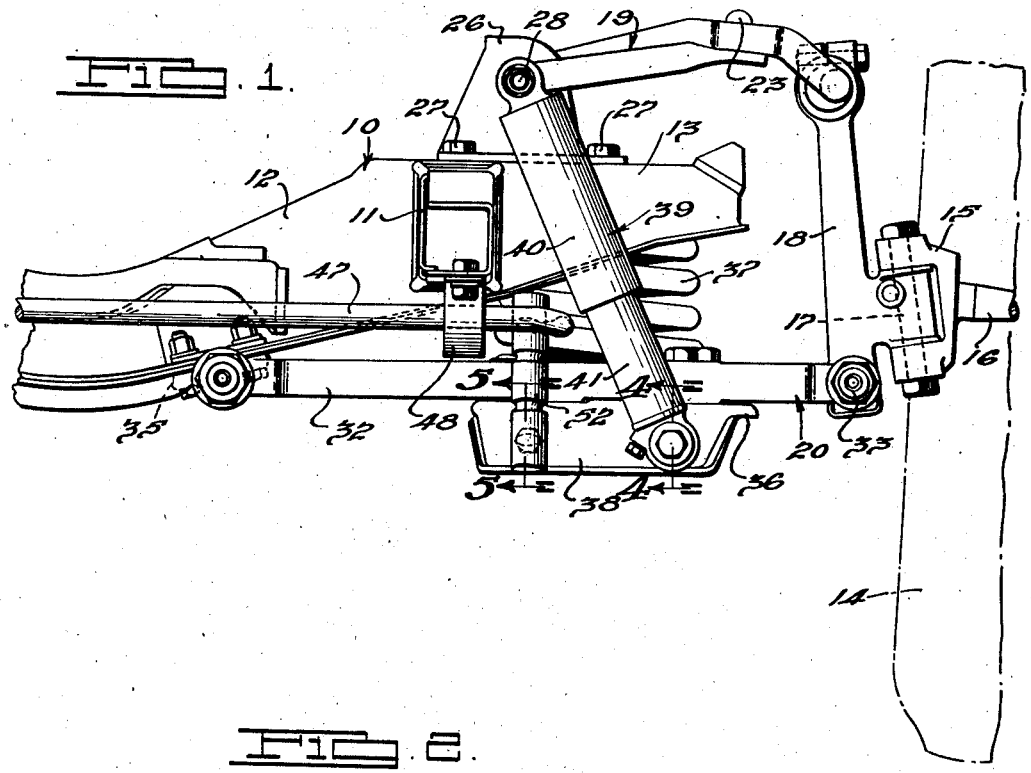
INVENTOR
Frederic W. Slack.
BY
Harness, Dirid, Patee & Harris
ATTORNEYS.

Feb. 13, 1940. F. W. SLACK 2,190,298
WHEEL SUSPENSION
Original Filed Aug. 26, 1936 2 Sheets-Sheet 2

INVENTOR
Frederic W. Slack.
BY
Harness, Dind, Patee & Harris
ATTORNEYS.

Patented Feb. 13, 1940

2,190,298

UNITED STATES PATENT OFFICE 2,190,298

WHEEL SUSPENSION

Frederic W. Slack, Detroit, Mich., assignor to Chrysler Corporation, Highland Park, Mich., a corporation of Delaware Application August 26, 1936, Serial No. 97,878
Renewed July 28, 1939

6 Claims. (Cl. 267—20)

This invention relates to motor vehicles and refers more particularly to improvements in wheel suspensions of the independently sprung type.

One object of my invention is to provide a simplified arrangement of suspension linkage and shock absorber, reducing the cost of manufacture and assembly of the suspension system as a whole, and increasing the general efficiency of the suspension when in operation.

A further object of my invention is to provide a simplified relatively low cost wheel suspension system embodying an improved sway bar or stabilizer member mounting and assembly.

More particularly, I have provided a suspension system which utilizes the pivotal support for the upper linkage to also connect with one of the operating parts of a shock absorber, thereby effecting a material saving in brackets and mounting parts which are ordinarily provided for the shock absorber support. Also, my novel arrangement preferably also embodies an improved mounting for another operation part of the shock absorber, such mounting also connecting with a sway bar or stabilizer when used with the system.

Further objects and advantages of my suspension system will be more apparent as my specification progresses, reference being had to the accompanying drawings illustrating one embodiment of my invention and in which:

Fig. 1 is a front elevational view showing a portion of a motor vehicle chassis and my independent wheel suspension mechanism for one of the steerable ground wheels.

Fig. 2 is a top plan view of the structure illustrated in Fig. 1.

Figure 3:
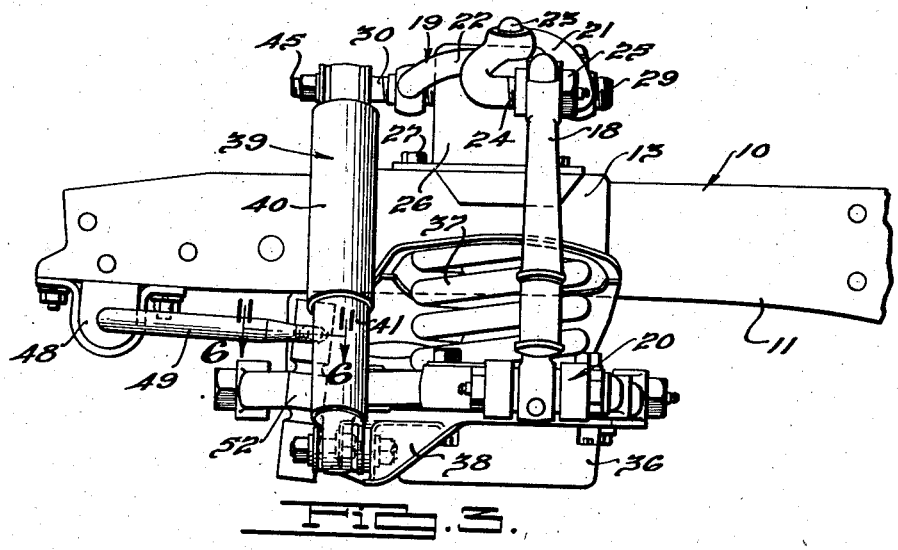
Fig. 3 is a side elevational view of the Fig. 1 structure.

According to the illustrated embodiment of my invention, the motor vehicle is provided with a suitable frame structure 10 having the usual side chassis rails, one of which is illustrated at 11 and a transversely extending cross member 12 which connects the side rails 11 and extends laterally outwardly therefrom at 13.

A typical front steerable ground wheel 14 is adapted to have rising and falling movements relative to the frame structure 10 and independently of the remaining ground wheels of the vehicle by reason of my supporting and guiding mechanism comprising a steering knuckle 15 rotatably journalling the wheel 14 by the usual spindle 16. The knuckle 15 is swivelly connected by a king pin 17 with the generally vertically extending knuckle bracket support arm 18 having articulated or pivoted connections at its upper and lower ends respectively with the upper and lower laterally extending linkages 19 and 20.

The linkages 19 and 20 may be of any suitable construction, the illustration showing these linkages as the wish bone type. Thus, the upper linkage 19 comprises a pair of outwardly converging arms 21 and 22 joined together at 23, the arm 21 having a cantilever threaded extension 24 extending longitudinally of the vehicle and providing the desired articulated connection with the upper end of the support arm 18, through the intermediary of the eccentric wheel camber adjusting bushing 25 if desired. The inwardly extending diverged ends of arms 21 and 22 straddle a supporting bracket 26 rigidly mounted on the frame structure 10 by suitable fasteners 27, this bracket mounting a longitudinally extending pivot pin or shaft 28. This shaft 28 has its longitudinally oppositely extending end portions threaded at 29 and 30 for respectively providing a pivoted or articulated connection with the inner ends of arms 21 and 22 adjacent the bracket 26.

The lower linkage 20 is likewise preferably formed by a pair of arms 31 and 32 converging laterally outwardly at the articulated connection 33 with the lower end of the support arm 18. The inner ends of arms 31 and 32 have articulated connection with the opposite ends of a support shaft 34 rigidly mounted by brackets 35 to the underside of the frame front members 12.

The arms 31 and 32 of the lower linkage 20 are connected intermediate their lengths by a sheet metal member 36 adapted to seat the lower end of a coil spring 37, the upper end of which acts against the projecting frame portion 13 for yieldingly supporting the frame structure 10 on wheel 14 through the intermediary of the suspension mechanism.

Figure 4:
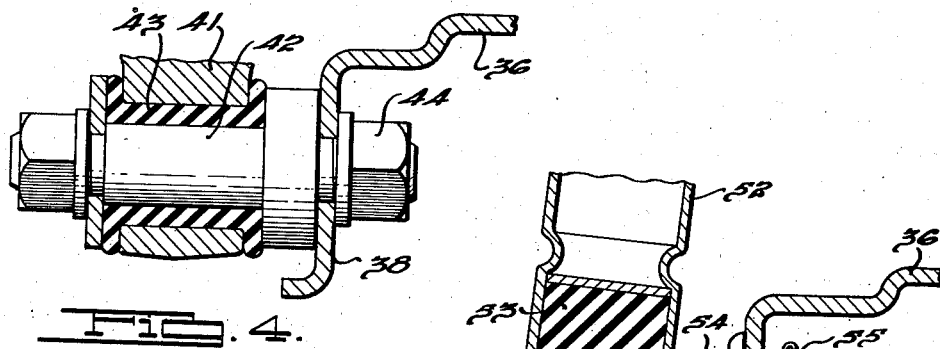
Fig. 4 is a detail sectional elevational view taken as indicated by the line 4—4 of Fig. 1.
Figure 5:
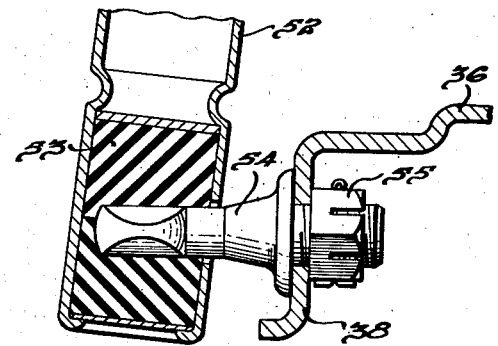
Fig. 5 is a detail sectional elevational view taken as indicated by the line 5—5 of Fig. 1.
Figure 6:
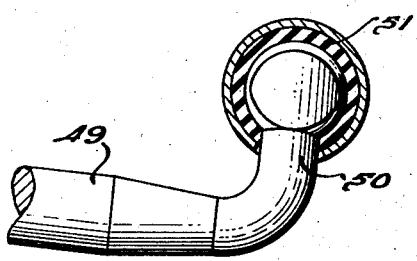
Fig. 6 is a detail sectional plan view illustrating the connection for one end of the equalizer member, the section being taken as indicated by the line 6—6 of Fig. 3.

The sheet metal member 36 is provided with a side boundary vertically extending reinforcing flange 38 which is utilized to take the thrust of the shock absorbing means and also the stabilizer means when the latter is desired to be employed. The shock absorber 39 is preferably of the well known direct acting telescoping tubular type having the telescope relatively movable towards and 41. The lower part 41 as best illustrated in Fig. 4 is mounted on a cantilever or outboard support pin 42 preferably through the intermediary of the sound deadening rubber bushing 43, the pin 42 being secured by a fastening means 44 with the aforesaid flange 38 so as to project forwardly therefrom in a general direction longitudinally of the vehicle. The companion shock absorber part 40 has its upper end directly connected to the same supporting structure which is already provided for articulating the inner ends of arms 21 and 22 of the upper linkage 19. This is preferably accomplished by providing a forward extension 45 of shaft 28, the upper end of shock absorber part 40 being articulated or pivotally mounted on the extension 45 preferably through the intermediary of a rubber bushing assembly 46 which may be generally similar to that illustrated at 43 in Fig. 4. The arrangement is therefore greatly simplified and the cost minimized by utilizing the support means of the upper linkage to connect with one of the moving parts of the shock absorber and also by utilizing the lower linkage and particularly the sheet metal spring support member for connection with the other moving part of the shock absorber.

When a stabilizer or anti-sway mechanism is employed, this is preferably in the form of a transversely extending equalizer bar 47 rotatably journalled in a rubber bushing assembly 48 at each of the side frame members 11, each end of the bar being similarly connected to one of the wheel suspension mechanisms. Thus, in the typical mechanism illustrated, the bar 47 has each end portion 49 extended longitudinally rearwardly from a bearing 48. The end portion 49 has its terminal 50 extending transversely inwardly for support in a rubber bushing 51 carried in the upper end of a hollow tubular link 52, the lower end of which has a similar rubber bushing 53 in which is embedded or articulated for pivoted connection the cantilever end of a support pin 54 connected by a fastener 55 to the aforesaid reinforcing flange 38 at a point preferably transversely inwardly spaced from the aforesaid pin 42 as best illustrated in Fig. 1.

In the operation of the suspension system, it will be apparent that the wheel 14 is capable of independent rising and falling movements, being supported and guided through the support arm 18 and the upper and lower linkages 19 and 20 articulated at their outer and inner ends respectively to the support arm and to the frame structure 10. During such movements of wheel 14, the shock absorber 39 will come into action to dampen the relative movements between the frame structure and wheel and when rounding a curve the equalizer bar 47 will come into action to yieldingly resist tilting or swaying of the frame structure according to the well known performance of such torsional devices. My improved arrangement of parts greatly simplifies and lessens the cost of manufacture of the suspension system as a whole by utilizing parts already provided in the system for the mounting of the shock absorber as well as the operating ends of the equalizer 47.

Various modifications and changes will be apparent from the teachings of my invention, as defined in the appended claims, and it is not my intention to limit my invention to the particular details of construction and mode of operation shown and described for illustrative purposes.

I claim:
1. In a motor vehicle having a frame structure, a road wheel disposed at one side of said frame structure, means structurally connecting said wheel and frame structure for supporting and guiding said wheel for independent rising and falling movements, including upper and lower linkages, means yieldingly supporting said frame structure on said supporting and guiding means, said lower linkage comprising a sheet metal member having a side boundary reinforcing flange, a shaft supported by said frame structure adjacent the inner end of said upper linkage for pivotally supporting said upper linkage, and a shock absorber comprising relatively movable parts respectively pivotally connected to said shaft and reinforcing flange.

2. In a motor vehicle having a frame structure, a road wheel disposed at each side of said frame structure, means structurally connecting each of said wheels and said frame structure for supporting and guiding said wheels for independent rising and falling movements, each of said supporting means including upper and lower linkages, means yieldingly supporting said frame structure on each of said wheel supporting means, each of said lower linkages comprising a sheet metal support for one of said yielding means, each of said sheet metal supports having a side boundary reinforcing flange, a stabilizer bar rotatably supported by said frame structure, and means pivotally connecting opposite ends of said stabilizer bar respectively to the reinforcing flanges of said sheet metal supports.

3. In a motor vehicle having a frame structure, a road wheel disposed at each side of said frame structure, means structurally connecting each of said wheels with said frame structure for supporting and guiding said wheels for independent rising and falling movements, each of said supporting and guiding means including upper and lower linkages, means yieldingly supporting said frame structure on each of said supporting and guiding means, each of said lower linkages comprising a sheet metal member having a side boundary reinforcing flange, a shaft supported by said frame structure adjacent the inner end of each of said upper linkages for pivotally supporting an upper linkage, a pair of shock absorbers each comprising relatively movable parts respectively pivotally connected to one of said shafts and a reinforcing flange, a stabilizer member supported by said frame structure, and means pivotally connecting the opposite ends of said stabilizer member respectively to said reinforcing flanges.

4. In a motor vehicle having a frame structure, a support bracket rigidly mounted on said frame structure, a road wheel disposed at one side of said structure, means structurally connecting said wheel and frame structure for supporting and guiding said wheel for independent rising and falling movements, including upper and lower linkages, said upper linkage including a pair of arms having diverging inner ends straddling said support bracket, a coil spring for supporting said frame structure on said supporting and guiding means, a sheet metal seat for said spring carried by said lower linkage, shock absorber means including a pair of relatively movable telescoped parts, means for articulating one of said teleparts, means for articulating one of said telescoped parts to said spring seat, and means including a shaft carried by said support bracket for supporting the inner ends of said arms relative to said frame structure, said shaft having an end portion projecting cantilever-like from said support bracket for supporting the other of said telescoped parts with respect to said frame structure outside of the vertical projection of the space between the arms of said upper linkage.

5. In a motor vehicle having a frame structure, a road wheel disposed at one side of said frame structure, means structurally connecting said wheel and frame structure for supporting and guiding said wheel for independent rising and falling movements, including upper and lower linkages, at least one of said linkages comprising a sheet metal member having a side boundary reinforcing flange, a shock absorber comprising relatively movable parts, and means for operatively connecting one of said shock absorber parts to said reinforcing flange.

6. In a motor vehicle having a frame structure, a road wheel disposed at one side of said frame structure, means structurally connecting said wheel and frame structure for supporting and guiding said wheel for independent rising and falling movements, including upper and lower linkages, at least one of said linkages comprising a sheet metal member having a side boundary reinforcing flange, a stabilizer member extending generally transversely across said frame structure, and means operatively connecting said stabilizer member to the reinforcing flange of said sheet metal member.

FREDERIC W. SLACK.